(12) United States Patent
Dunn et al.

(10) Patent No.: US 7,586,685 B2
(45) Date of Patent: Sep. 8, 2009

(54) MICROLENS SHEETING WITH FLOATING IMAGE USING A SHAPE MEMORY MATERIAL

(76) Inventors: Douglas S. Dunn, P.O. Box 33427, St. Paul, MN (US) 55133-3427; Mieczyslaw H. Mazurek, P.O. Box 33427, St. Paul, MN (US) 55133-3427; James M. Jonza, P.O. Box 33427, St. Paul, MN (US) 55133-3427

( * ) Notice: Subject to any disclaimer, the term of this patent is extended or adjusted under 35 U.S.C. 154(b) by 111 days.

(21) Appl. No.: 11/495,999

(22) Filed: Jul. 28, 2006

(65) Prior Publication Data

US 2008/0024872 A1    Jan. 31, 2008

(51) Int. Cl.
*G02B 27/10* (2006.01)
(52) U.S. Cl. .................................. 359/619; 359/626
(58) Field of Classification Search ......... 359/619–628, 359/707, 454–456
See application file for complete search history.

(56) References Cited

U.S. PATENT DOCUMENTS

| | | | |
|---|---|---|---|
| 1,905,716 A | 4/1933 | Ives | |
| 1,918,705 A | 7/1933 | Ives | |
| 2,039,648 A | 5/1936 | Ives | |
| 2,063,985 A | 12/1936 | Coffey | |
| 2,279,825 A | 4/1942 | Kaszab | |
| 2,326,634 A | 8/1943 | Gebhard et al. | |
| 2,500,511 A | 3/1950 | Bonnet | |
| 2,622,472 A | 12/1952 | Bonnet | |
| 2,833,176 A | 5/1958 | Ossoinak | |
| 3,154,872 A | 11/1964 | Nordgren | |
| 3,161,509 A | 12/1964 | Howe et al. | |
| 3,306,974 A | 2/1967 | Cunnally | |
| 3,357,770 A | 12/1967 | Clay | |

(Continued)

FOREIGN PATENT DOCUMENTS

DE    198 04 997 C1    2/1999

(Continued)

OTHER PUBLICATIONS

Weekly Reports of the Meetings of the Academy of Science published, in accordance with an academy decision dated Jul. 13, 1835, vol. 146, Jan.-Jun. 1908, pp. 446-451.

(Continued)

*Primary Examiner*—Ricky L Mack
*Assistant Examiner*—Vipin M Patel

(57) ABSTRACT

A sheeting includes a layer of a shape-memory polymer material having a surface of microlenses, wherein each of the microlenses is associated with one of a plurality of images within the sheeting. The layer of the shape-memory polymer material is responsive to an external stimulus; e.g., temperature, solvent, or moisture; by transitioning from a first state in which an optical property of the microlenses has a first value to a second state in which the optical property of the microlenses has a second value. The microlenses have refractive surfaces that transmit light to positions within the sheeting to produce a composite image from the images formed within the sheeting when the layer of the shape-memory polymer material is in one of the first state and the second state. At least one of the images is a partially complete image, and each of the images is associated with a different one of the microlenses.

26 Claims, 10 Drawing Sheets

U.S. PATENT DOCUMENTS

| | | | |
|---|---|---|---|
| 3,365,350 A | 1/1968 | Cahn | |
| 3,442,569 A | 5/1969 | Bonnet | |
| 3,459,111 A | 8/1969 | Cooper, Jr. | |
| 3,503,315 A | 3/1970 | Montebello | |
| 3,584,369 A | 6/1971 | Montebello | |
| 3,607,273 A | 9/1971 | Kinney | |
| 3,613,539 A | 10/1971 | Dudley | |
| 3,676,130 A | 7/1972 | Burckhardt et al. | |
| 3,706,486 A | 12/1972 | de Montebello | |
| 3,751,258 A | 8/1973 | Howe et al. | |
| 3,801,183 A | 4/1974 | Sevelin et al. | |
| 4,034,555 A | 7/1977 | Rosenthal | |
| 4,082,426 A | 4/1978 | Brown | |
| 4,099,838 A | 7/1978 | Cook et al. | |
| 4,121,011 A | 10/1978 | Glover et al. | |
| 4,200,875 A | 4/1980 | Galanos | |
| 4,315,665 A | 2/1982 | Haines | |
| 4,420,527 A * | 12/1983 | Conley | 428/172 |
| 4,424,990 A | 1/1984 | White et al. | |
| 4,541,727 A | 9/1985 | Rosenthal | |
| 4,541,830 A | 9/1985 | Hotta et al. | |
| 4,552,442 A | 11/1985 | Street | |
| 4,557,590 A | 12/1985 | Winnek | |
| 4,618,552 A | 10/1986 | Tanaka et al. | |
| 4,629,667 A | 12/1986 | Kistner et al. | |
| 4,632,895 A | 12/1986 | Patel et al. | |
| 4,634,220 A | 1/1987 | Hockert et al. | |
| 4,650,283 A | 3/1987 | Orensteen et al. | |
| 4,668,063 A | 5/1987 | Street | |
| 4,688,894 A | 8/1987 | Hockert | |
| 4,691,993 A | 9/1987 | Porter et al. | |
| 4,700,207 A | 10/1987 | Vanier et al. | |
| 4,708,920 A | 11/1987 | Orensteen et al. | |
| 4,714,656 A | 12/1987 | Bradshaw et al. | |
| 4,732,453 A | 3/1988 | de Montebello et al. | |
| 4,743,526 A | 5/1988 | Ando et al. | |
| 4,757,350 A | 7/1988 | Street | |
| 4,772,582 A | 9/1988 | DeBoer | |
| 4,775,219 A | 10/1988 | Appeldorn et al. | |
| 4,783,141 A * | 11/1988 | Baba et al. | 359/619 |
| 4,799,739 A | 1/1989 | Newswanger | |
| 4,833,124 A | 5/1989 | Lum | |
| 4,876,235 A | 10/1989 | DeBoer | |
| 4,927,238 A | 5/1990 | Green et al. | |
| 4,935,335 A | 6/1990 | Fotland | |
| 5,064,272 A | 11/1991 | Bailey et al. | |
| 5,091,483 A | 2/1992 | Mazurek et al. | |
| 5,105,206 A | 4/1992 | Sarraf et al. | |
| 5,169,707 A | 12/1992 | Faykish et al. | |
| 5,244,288 A | 9/1993 | Nagaoka et al. | |
| 5,254,390 A | 10/1993 | Lu | |
| 5,264,278 A | 11/1993 | Mazurek et al. | |
| 5,279,912 A | 1/1994 | Telfer et al. | |
| 5,308,737 A | 5/1994 | Bills et al. | |
| 5,326,619 A | 7/1994 | Dower et al. | |
| 5,330,799 A | 7/1994 | Sandor et al. | |
| 5,359,454 A | 10/1994 | Steenblik et al. | |
| 5,360,694 A | 11/1994 | Thien et al. | |
| 5,364,740 A | 11/1994 | Fohrenkamm et al. | |
| 5,449,597 A | 9/1995 | Sawyer | |
| 5,455,689 A | 10/1995 | Taylor et al. | |
| 5,459,016 A | 10/1995 | Debe et al. | |
| 5,491,045 A | 2/1996 | DeBoer et al. | |
| 5,493,427 A * | 2/1996 | Nomura et al. | 349/5 |
| 5,521,035 A | 5/1996 | Wolk et al. | |
| 5,554,432 A | 9/1996 | Sandor et al. | |
| 5,589,246 A | 12/1996 | Calhoun et al. | |
| 5,594,841 A | 1/1997 | Schutz | |
| 5,639,580 A | 6/1997 | Morton | |
| 5,642,226 A | 6/1997 | Rosenthal | |
| 5,644,431 A | 7/1997 | Magee | |
| 5,671,089 A | 9/1997 | Allio | |
| 5,680,171 A | 10/1997 | Lo et al. | |
| 5,681,676 A | 10/1997 | Telfer et al. | |
| 5,685,939 A | 11/1997 | Wolk et al. | |
| 5,689,372 A | 11/1997 | Morton | |
| 5,712,731 A | 1/1998 | Drinkwater et al. | |
| 5,717,844 A | 2/1998 | Lo et al. | |
| 5,744,291 A | 4/1998 | Ip | |
| 5,757,550 A | 5/1998 | Gulick, Jr. | |
| 5,843,617 A | 12/1998 | Patel et al. | |
| 5,850,278 A | 12/1998 | Lo et al. | |
| 5,850,580 A | 12/1998 | Taguchi et al. | |
| 5,856,061 A | 1/1999 | Patel et al. | |
| 5,889,118 A | 3/1999 | Delgado et al. | |
| 5,894,069 A | 4/1999 | Wen et al. | |
| 5,896,230 A | 4/1999 | Goggins | |
| 5,935,758 A | 8/1999 | Patel et al. | |
| 5,945,249 A | 8/1999 | Patel et al. | |
| 5,994,026 A | 11/1999 | DeBoer et al. | |
| 6,057,067 A | 5/2000 | Isberg et al. | |
| 6,084,713 A | 7/2000 | Rosenthal | |
| 6,092,465 A | 7/2000 | Agronin | |
| 6,110,645 A | 8/2000 | DeBoer et al. | |
| 6,197,474 B1 | 3/2001 | Niemeyer et al. | |
| 6,228,555 B1 | 5/2001 | Hoffend, Jr. et al. | |
| 6,242,152 B1 | 6/2001 | Staral et al. | |
| 6,288,842 B1 | 9/2001 | Florczak et al. | |
| 6,291,143 B1 | 9/2001 | Patel et al. | |
| 6,369,844 B1 | 4/2002 | Neumann et al. | |
| 6,468,715 B2 | 10/2002 | Hoffend, Jr. et al. | |
| 7,068,434 B2 | 6/2006 | Florczak et al. | |
| 7,245,430 B2 * | 7/2007 | Kobayashi et al. | 359/464 |
| 7,253,958 B2 * | 8/2007 | Aizenberg et al. | 359/619 |
| 2002/0054434 A1 * | 5/2002 | Florczak et al. | 359/619 |
| 2002/0145807 A1 * | 10/2002 | Nishikawa | 359/619 |
| 2006/0262411 A1 | 11/2006 | Dunn et al. | |
| 2007/0081254 A1 | 4/2007 | Endle et al. | |

FOREIGN PATENT DOCUMENTS

| | | |
|---|---|---|
| EP | 0 175 504 | 3/1986 |
| EP | 0 583 766 | 2/1994 |
| EP | 0 658 443 | 6/1995 |
| EP | 0 673 785 | 9/1995 |
| EP | 0 363 919 | 1/1996 |
| EP | 0 688 351 | 8/1997 |
| EP | 0 655 347 | 9/1997 |
| EP | 0 615 860 | 8/1998 |
| EP | 1 079274 | 12/2004 |
| GB | 1 308 116 | 2/1973 |
| GB | 1 433 025 | 4/1976 |
| GB | 2 083 726 | 3/1982 |
| JP | 4309583 | 11/1992 |
| JP | 7-281327 | 10/1995 |
| WO | 83/03019 | 9/1983 |
| WO | 95/26281 | 10/1995 |
| WO | 97/15173 | 4/1997 |
| WO | 97/46631 | 12/1997 |
| WO | 99/37949 | 7/1999 |
| WO | 03/061983 | 7/2003 |

OTHER PUBLICATIONS

3M Security Systems Division, 3M™ Full Page Reader Product Fact Sheet, 2004, 6 pages.

3M Security Systems Division, 3M™ ePassport Reader Product Fact Sheet, 2004, 6 pages.

3M Security Systems Division, 3M™ Inspection Reader Product Fact Sheet, 2004, 2 pages.

3M Security Systems Division, 3M™ Authentication Reader Product Fact Sheet, 2004, 4 pages.

Y.A. Dudnikov and B.K. Rozhkov, "Raster systems for producing of three-dimensional images", Leningrad, Maschinostroeniye, 1986, pp. 119-123.

De Montebello, "Processing and Display of Three-Dimensional Data II", Proceedings of SPIE, vol. 507, San Diego, 1984.

Kim et al., "Polyurethanes having shape memory effects", *Polymer*, vol. 37, No. 26, pp. 5781-8793, 1996.

Lendlein et al., "AB-polymer networks based on oligo (ε-caprolactone) segments showing shape-memory properties", PNAS, vol. 98, No. 3, pp. 842-847, 2001.

Lendlein and Kelch, "Shape-memory polymers", Angew. Chem. Int. Ed. 2002, 41, 2034-2057.

Lendlein and Langer, "Biodegradable, elastic shape-memory polymers for potential biomedical applications", Science, vol. 296, pp. 1673-1676, 2002.

Mazurek et al., "Novel materials based on silicone-acrylate copolymer networks", Journal of Applied Polymer Science, vol. 80, pp. 159-180, 2001.

Factiva WireWatch Message, "Shape-memory polymers offer new twist on applications", Modern Plastics International, Chemical Business NewsBase, Apr. 24, 2003.

U.S. Appl. No. 11/399,695, filed Apr. 6, 2006, Florczak et al.

U.S. Appl. No. 11/248,950, filed Oct. 11, 2005, Endle et al.

U.S. Appl. No. 11/495,999, filed Jul. 28, 2006, Dunn et al.

U.S. Appl. No. 11/460,682 to Sherman et al., filed Jul. 26, 2006 entitled Methods for Changing the Shape of a Surface of a Shape Memory Polymer Article.

U.S. Appl. No. 11/460,685 to Mazurek et al., filed Jul. 28, 2006 entitled Shape Memory Polymer Articles with a Microstructured Surface.

* cited by examiner

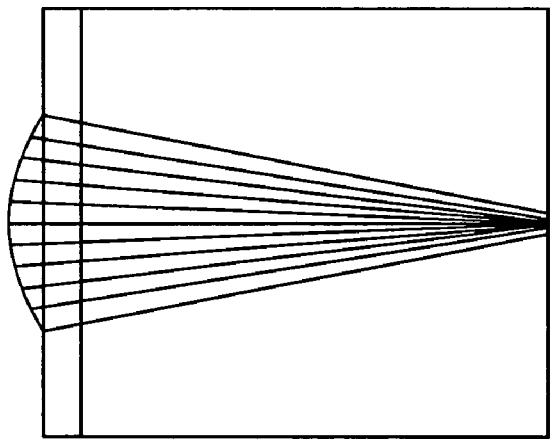
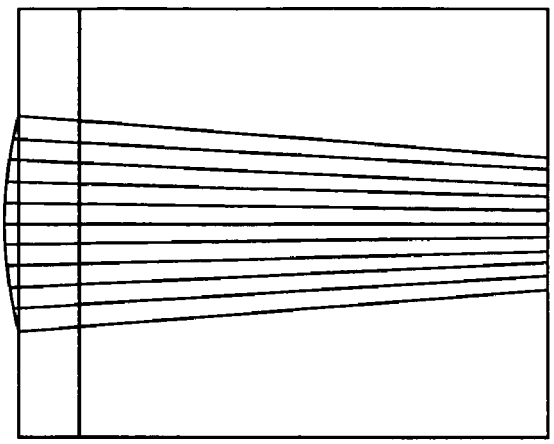
Fig. 7A              Fig. 7B
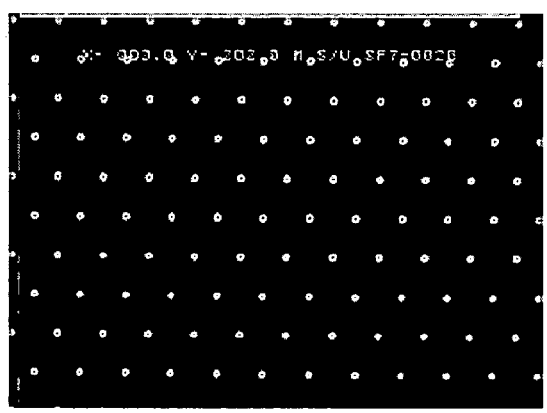
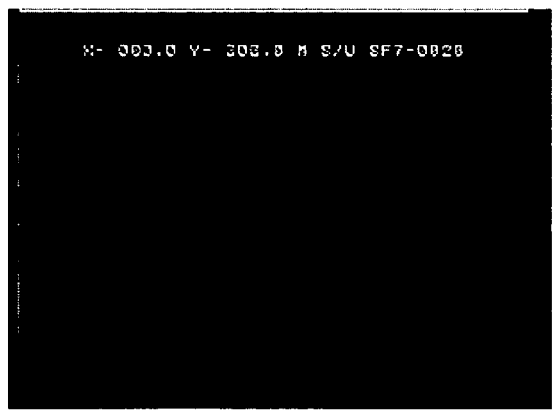
Fig. 8A              Fig. 8B

MICROLENS SHEETING WITH FLOATING IMAGE USING A SHAPE MEMORY MATERIAL

CROSS-REFERENCE TO RELATED APPLICATIONS

This application is related to commonly assigned, co-pending U.S. patent application Ser. No. 11/460,685, filed Jul. 28, 2006, entitled "Shape Memory Polymer Articles with Microstructured Surface;" and to commonly assigned, co-pending U.S. patent application Ser. No. 11/460,682, filed Jul. 28, 2006, entitled "Methods for Changing the Shape of a Surface of a Shape Memory Polymer Article."

TECHNICAL FIELD

The invention relates to sheeting that provides one or more composite images.

BACKGROUND

Sheeting materials having a graphic image or other mark have been widely used, particularly as labels for authenticating an article or document. For example, one conventional imaged sheeting uses a high-gain retroreflective sheeting of the exposed-lens type in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged.

The energy of the laser beam is further concentrated by the focusing effect of the microlenses embedded in the binder layer. The images formed in this retroreflective sheeting can be viewed if, and only if, the sheeting is viewed from substantially the same angle at which the laser irradiation was directed at the sheeting. That means, in different terms, that the image is only viewable over a very limited observation angle.

SUMMARY

In general, this disclosure describes a sheeting formed of a shape-memory polymer material having shape-memory characteristics that cause the sheeting to transition between a first state and a second state in response to an external stimulus. The sheeting has a layer of microlenses on one surface of the shape-memory polymer material. As a result of the shape-memory characteristics of the shape-memory polymer material, the optical properties of the microlenses can be changed in a controlled and repeatable manner upon exposure to the external stimulus. For example, the sheeting may be imaged so as to present a composite image when viewed at the appropriate viewing angle. The composite image may visibly "appear" or "disappear" in response to the external stimulus. This example effect is due to a change in an optical property of the microlenses that is a result of a change to the physical shape of the layer of microlenses due to the transition of the shape-memory polymer material. For example, when the sheeting is exposed to an external stimulus, such as heat, solvent, or moisture, the sheeting transitions from a first physical state to a second physical state. An optical property of the microlenses, such as focal length, changes from a first value to a second value in response to the physical transition experienced by the shape-memory polymer material.

The sheeting described herein may be used in a variety of applications. As one example, the sheeting may be used as a passive sensor for visually indicating exposure to a given temperature. As another example, the sheeting may operate as a moisture sensor, pressure sensor or may sense the presence of a solvent. The sheeting may also be used as a security feature that visually alters in response to the external stimulus, thereby confirming authenticity of an article to which the sheeting is affixed. As a security feature, the sheeting may be used in a variety of applications such as banknotes, passports, drivers' licenses, identification cards, credit cards, or other security documents.

In one embodiment, a sheeting comprises a layer of a shape-memory polymer material having a surface of microlenses, wherein each of the microlenses is associated with one of a plurality of images within the sheeting. The layer of the shape-memory polymer material is responsive to an external stimulus by transitioning from a first state in which an optical property of the microlenses has a first value to a second state in which the optical property of the microlenses has a second value.

In another embodiment, a method comprises forming a sheeting including a layer of a shape-memory polymer material into a permanent shape, wherein the layer has a surface of microlenses, and imaging the sheeting such that the surface of microlenses forms images at positions within the sheeting. The method further includes deforming the layer of the shape-memory polymer material to a temporary shape.

In another embodiment, an article has a sheeting affixed thereto, wherein the sheeting comprises a layer of a shape-memory polymer material having a surface of microlenses that visually produce a composite image from one or more images formed at positions within the sheeting. The layer of the shape-memory polymer material is responsive to an external stimulus by transitioning from a first state in which an optical property of the microlenses has a first value to a second state in which the optical property of the microlenses has a second value.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 7A-7B are ray tracings illustrating the results of a ray tracing model for an as-cast lens and a flattened lens.

FIGS. 8A-8B are optical micrographs for an as-cast lens and a flattened lens.

DETAILED DESCRIPTION

Figure 1A:
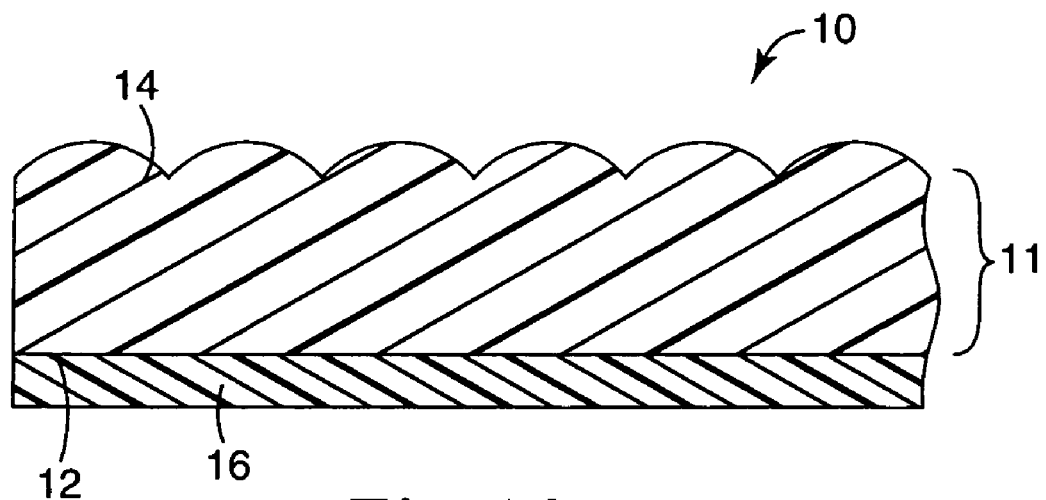
FIGS. 1A-1B are enlarged cross-sectional views of example microlens sheetings formed from a shape-memory material.

FIG. 1A is an enlarged cross-sectional view of an example sheeting 10. In this example, sheeting 10 comprises a planoconvex or aspheric base sheet 11 having first and second surfaces, the first surface having an array of substantially hemi-spheroidal or hemi-aspheroidal microlenses 14 and the second surface 12 being substantially planar. The base sheet 11 is formed from a shape-memory polymer material, as described in further detail below. In this first embodiment, the shape of the microlenses and thickness of the base sheet 11 are selected such that collimated light incident to the array is focused approximately at the second face 12. A layer of material 16 is provided on the second face of the sheeting 10. In some embodiments, layer of material 16 may be a radiation-sensitive material. Base sheet 11 may be transparent, translucent, or semi-translucent.

Figure 1B:
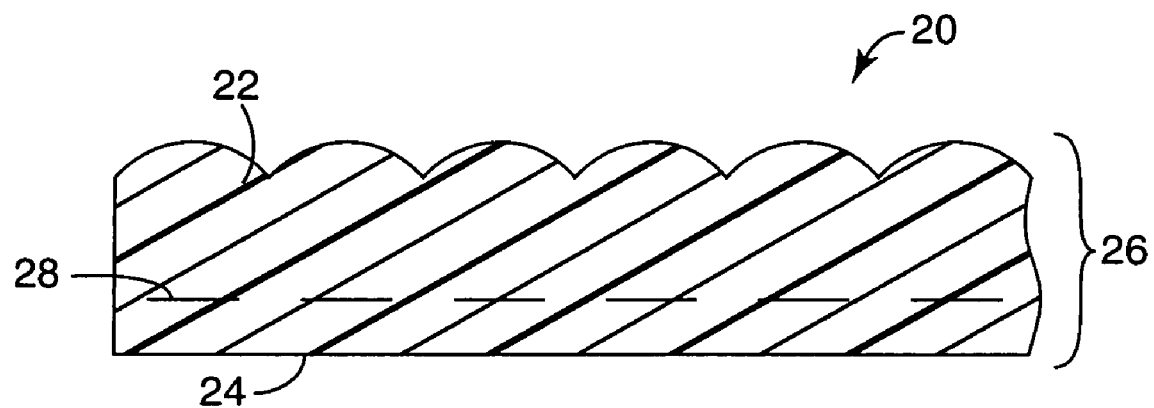

FIG. 1B is an enlarged cross-sectional view of a microlens sheeting 20 that contains a single layer of microlenses. In the illustrated embodiment of FIG. 1B, sheeting 20 comprises a transparent plano-convex or aspheric sheeting having first and second surfaces the first surface having an array of substantially hemi-spheroidal or hemi-aspheroidal microlenses 24 formed thereon and the second surface 22 being substantially planar. The layer 26 is formed from a shape-memory polymer material, as described in further detail below. In this second embodiment, the shape of the microlenses 24 and the thickness of the layer 26 are selected such that collimated light incident to the array is focused at regions 28 internal to the single layer 26. The thickness of layer 26 depends at least in part on the optical characteristics of the microlenses 24, such as the distance at which the microlenses focus light. For example, microlenses may be used that focus light at a distance of 60 μm from the front of the lens. In some embodiments, the thickness of layer 26 may be between 20-100 μm so that the microlenses focus the light internal to layer 26.

The microlenses of the sheetings 10, 20 of FIGS. 1A-1B preferably have an image-forming refractive surface in order for image formation to occur; generally, this is provided by a curved microlens surface. For curved surfaces, the microlenses will preferably have a uniform index of refraction. The image focal length f of a spherical refractive surface immersed in air is given by the expression:

$$f = \frac{nR}{n-1}, \quad (1)$$

where n is the index of refraction of the material comprising the surface, and R is the radius of curvature of the surface. The index of refraction is dependent upon the electronic properties of the constituent atoms of the material and is therefore fixed for a specific wavelength of light if the electronic configuration of the atoms cannot be changed. In this case, one means for controlling the imaging properties of a refractive surface is through change in the radius of curvature, i.e., the shape, of the spherical refractive surface. The techniques of the disclosure provide a mechanism for controlled change of the shape of the refractive surfaces of the microlenses 14, 22 formed from a shape-memory polymer material upon exposure to external stimulus, or environmental changes.

The environmentally-sensitive microlenses could be used as the lens layer in the "floating image" sheetings described in U.S. application Ser. No. 11/399,695, entitled "SHEETING WITH COMPOSITE IMAGE THAT FLOATS," filed Apr. 6, 2006, which is a continuation-in-part of U.S. application Ser. No. 09/898,580, filed Jul. 3, 2001, which is a continuation-in-part of U.S. application Ser. No. 09/510,428, filed Feb. 22, 2000, now U.S. Pat. No. 6,288,842, the entire content of each of which is hereby incorporated herein by reference. Since the optical properties of the microlenses, e.g., the radius of curvature and thus the focal length, can be made to change upon exposure to different external stimuli, a sheeting can be produced that visually provides a floating image having an appearance that predictably changes based on environmental factors.

Although the microlens surfaces are preferably spherical in nature, aspherical surfaces are also acceptable. The microlenses may have any symmetry, such as cylindrical or spherical, provided the refraction surfaces form real images either within layer of material 16 (FIG. 1A) or at regions 26 by way of material degradation, ablation, composition change, or phase change (FIG. 1 B). The microlenses may be formed from a replication or embossing process, where the surface of the sheeting is altered in shape to produce a repetitive profile with imaging characteristics.

In accordance with the principles of the invention, the microlenses are formed of a shape-memory polymer material. That is, in the examples of FIGS. 1A and 1B, base sheeting 11 of FIG. 1A or layer 28 of FIG. 1B is formed from a shape-memory polymer material. In general, shape-memory polymer materials are polymers that respond to external stimulus by physically changing shape. Notably, shape-memory polymer materials can be formed in a "permanent" shape (referred to herein as the second physical "state"), deformed to a temporary shape (the first physical "state") at a temperature above a transition temperature $T_{trans}$ and cooled while held in the deformed shape. Upon release, the material will retain its temporary shape until exposed to a temperature above the $T_{trans}$, at which point the material transitions to the second physical state and resumes its permanent shape. One component of the shape-memory material, referred to as the "switching" segment, determines the permanent and temporary shapes of the polymer. Above the $T_{trans}$ of the switching segments, the switching segments are flexible, the polymer can be deformed. Below the $T_{trans}$ of the switching segments, the switching segments lose their flexibility.

The desired shape may be made permanent by cross-linking the polymer structure. The cross-links may be either chemical or physical. For example, rubber is cross-linked to prevent flow by addition of tri or tetra functional reactants, e-beam cross-linking, or peroxides that decompose to form free radicals that start side chains that eventually cross-link the polymer. An average molecular weight between cross-links that is comparable to the entanglement molecular weight or smaller is preferred to cycle the structure without distortion due to flow.

An example of a preferred covalently cross-linked system may be based on ethylene copolymers. Any comonomers that reduce the polyethylene crystal structure size to minimize light scattering for a clearer virtual image are suitable. Electron beam irradiation or peroxide cross-linking can be employed, followed by heating, and cooling into the temporary shape. When the material is heated above the melting temperature, the permanent shape will be recovered.

Physically cross-linked polymers are the basis of thermoplastic elastomers. These rubbery materials may be injection molded and even molded again by re-melting, unlike covalently cross-linked rubbers. Block copolymers may be preferred. Some examples are polyurethane hard segments with polyol or polyester soft segments, or polystyrene hard segments with polyolefin soft segments. For these types of polymers to be useful for this invention, the transition temperature for the switching segment should be lower than $T_g$ or $T_m$ of the hard segment. For example, the polyester switching segment may be based on polycaprolactone, and melt in the vicinity of 60° C., while the polyurethane hard segment may have a glass transition temperature of about 130° C. A practical temperature range for forming the permanent shape is between 130° C. and the decomposition threshold. A practical range for forming the temporary shape is 65 to 125° C., with cooling against that shape to below 50° C. to allow the polyester switching segment to crystallize. Subsequent reheating to above 60° C. will melt the polyester segments, and allow the permanent shape to re-form.

The external stimulus may be, therefore, a change in temperature. Alternatively, material may be designed to change states when exposed to a solvent, exposed to moisture, exposed to change in pressure, or to other environmental changes. For example, exposure to a solvent may lower the effective $T_{trans}$ of the material below room temperature. The transition temperature of a shape-memory material may be the melting temperature $T_m$ or the glass-transition temperature $T_g$ of the shape-memory material. Although the transition temperature will be generally referred to throughout this disclosure as the glass-transition temperature $T_g$, it is understood that the transition temperature may instead be the melting point $T_m$ of the material. Further, in some embodiments, the shape-memory polymer material may have more than one transition temperature.

By way of example, the shape-memory polymer of which the microlenses are formed may be a polyurethane with a poly(F-caprolactone) switching segment; a polyurethane with a poly(tetrahydrofuran) switching segment; polynorbornene; polyethylene, ethylene copolymers or other polymers covalently cross-linked using ionizing radiation (heat-shrinkable polymers); an oligo(F-caprolactone)diol functionalized with methacrylate end groups; or other shape-memory polymer. As another example, the shape-memory polymer may be formed from telechelic siloxanes with different functionalities and a range of molecular weights coreacted with a (meth)acrylate monomer at different ratios of siloxane to acrylate. For example, the telechelic siloxane may be methacryloxyurea siloxane (MAUS), acrylamidoamido siloxane (ACMAS), methacrylamidoamido siloxane (MACMAS), or methylstyrylurea siloxane (MeStUS). Also by way of example, the (meth)acrylate monomer may be isobornyl acrylate (IBA), cyclohexyl acrylate, trimethyl cyclohexyl acrylate, methyl methacrylate, methacrylic acid, or t-butyl acrylate. As a further example, the shape-memory polymer of which the microlenses are formed may comprise a polysiloxane with a poly(meth)acrylate switching segment.

Microlenses with a uniform refractive index of between 1.35 and 3.0 over the visible and infrared wavelengths may be most useful. Suitable microlens materials will have minimal absorption of visible light, and in embodiments in which an energy source is used to image a radiation-sensitive layer, the materials should exhibit minimal absorption of the energy source as well. In the example embodiment illustrated in FIG. 1A, the refractive power of the microlenses 14 is preferably such that the light incident upon the refracting surface will refract and focus on the opposite side of each microlens, i.e., the light will be focused either on the back surface 12 of the microlenses or on the material 16 adjacent to the microlenses 14. In embodiments in which the material layer 16 is radiation sensitive, the microlenses 14 preferably form a demagnified real image at the appropriate position on that layer. Demagnification of the image by approximately 100 to 800 times is particularly useful for forming images that have good resolution.

One manner of providing the image patterns within the sheeting, e.g., in the layer of microlenses or on the layer of material adjacent the microlenses, is to use a radiation source to image the sheeting. Devices capable of providing radiation having a wavelength of between 200 nm and 11 micrometers are believed to be particularly preferred. Examples of high peak power radiation sources useful for this invention include excimer flashlamps, passively Q-switched microchip lasers, and Q-switched Neodymium doped-yttrium aluminum garnet (abbreviated Nd:YAG), Neodymium doped-yttrium lithium fluoride (abbreviated Nd:YLF) and Titanium doped-sapphire (abbreviated Ti:sapphire) lasers. These high peak power sources are most useful with radiation-sensitive materials that form images through ablation, i.e., the removal of material, or in multiphoton absorption processes. Other examples of useful radiation sources include devices that give low peak power such as laser diodes, ion lasers, non Q-switched solid state lasers, metal vapor lasers, gas lasers, arc lamps and high power incandescent light sources. These sources are particularly useful when the radiation-sensitive medium is imaged by a non-ablative method.

To image sheeting 10 of FIG. 1A or sheeting 20 of FIG. 1B, the energy from the radiation source is directed toward the microlenses 14 or 22, respectively, and controlled to give a highly divergent beam of energy. An exemplary imaging process according to this invention consists of directing collimated light from a laser through a lens toward the microlens sheeting. To create a sheeting having a floating image, as described further below, in one embodiment the light is transmitted through a diverging lens with a high numerical aperture (NA) to produce a cone of highly divergent light. For example, a lens with a NA equal to or greater than 0.3 may be used in certain embodiments.

The "object" to be imaged may be formed through the use of an intense light source by either tracing the outline of the "object" or by the use of a mask. For the image thus recorded to have a composite aspect, the light from the object radiates over a broad range of angles. When the light radiating from an object is coming from a single point of the object and is radiating over a broad range of angles, all the light rays are carrying information about the object, but only from that single point, though the information is from the perspective of the angle of the light ray. Because each individual microlens occupies a unique position relative to the optical axis, the light impinging on each microlens will have a unique angle of incidence relative to the light incident on each other microlens. Thus, the light will be transmitted by each microlens to a unique position of the sheeting, and produce a unique image.

More precisely, in the example of tracing the outline of the object, a single light pulse produces only a single imaged dot in the sheeting, so to provide an image adjacent each microlens, multiple pulses of light are used to create that image out of multiple imaged dots. For each pulse, the optical axis is located at a new position relative to the position of the optical axis during the previous pulse. The successive changes in the position of the optical axis relative to the microlenses results in a corresponding change in the angle of incidence upon each microlens, and accordingly in the position of the imaged dot created in the sheeting by that pulse. As a result, the incident light focused by the microlens images a selected pattern in the radiation-sensitive layer. Because the position of each microlens is unique relative to every optical axis, the image formed in the radiation-sensitive material (or in the microlens itself) for each microlens will be different from the image associated with every other microlens.

Another method for forming floating composite images uses a lens array to produce the highly divergent light to image the sheeting. The lens array consists of multiple small lenses all with high numerical apertures arranged in a planar geometry. When the array is illuminated by a light source, the array will produce multiple cones of highly divergent light, each individual cone being centered upon its corresponding lens in the array. By virtue of the size of the array, the individual cones of energy formed by the lenslets will expose the sheeting as if an individual lens was positioned sequentially at all points of the array while receiving pulses of light. The selection of which lenses receive the incident light occurs by the use of a reflective mask having transparent areas corresponding to sections of the composite image that are to be exposed and reflective areas where the image should not be exposed. By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting.

The individual images formed in the sheeting, when viewed by an observer under reflected or transmitted light, provide a composite image that appears to be suspended or to float, above, in the plane of, and/or below the sheeting. The composite images formed by the above imaging techniques can be thought of as the result of the summing together of many images, both partial and complete, all with different perspectives of a real object. The many unique images are formed through an array of miniature lenses, all of which "see" the object or image from a different vantage point. Behind the individual miniature lenses, a perspective of the image is created in the sheeting that depends on the shape of the image and the direction from which the imaging energy source was received. However, not everything that the lens sees is recorded in the sheeting. Only that portion of the image or object seen by the lens that has sufficient energy to modify the sheeting will be recorded.

A composite image that floats above the sheeting may be created using an optical imaging technique involving a diverging lens such that a set of hypothetical "image rays" traced from the material layer through each of the microlenses and back through the diverging lens would meet at a location above the sheeting. In the same manner, a composite image that floats below the sheeting is created using an optical imaging technique involving a converging lens such that a set of hypothetical "image rays" traced from the material layer through each of the microlenses and back through the converging lens would meet at a location below the sheeting.

Other methods of forming the floating composite image may be used that do not require layer of material 16 (FIG. 1A) to be a radiation sensitive material. As examples, individual images may be formed on the layer of material 16 using high resolution ink-based printing technology, photolithographic techniques or nanoreplication of the desired structures. The individual images may be complete or partially complete images, wherein each individual image is associated with a different microlens, that when viewed through the microlenses form a composite image. For example, the sheeting may employ the principles of Moire magnification. See, for example, U.S. Pat. No. 5,712,731 to Drinkwater et al., issued Jan. 27, 1998. For example, a sheeting may include individual images having components printed using ink as well as components imaged as described above. In some embodiments in which the sheeting involves Moire magnification, each of the individual images associated with the microlenses may be identical. As another example, a high intensity source may be used to form individual images by causing photodegradation or charring of the layer of material behind each microlens.

Composite images made in accordance with the principles of the present invention may appear to be either two-dimensional (having length and width) and appear either below, or in the plane of, or above the sheeting; or three-dimensional (having length, width, and height). Three-dimensional composite images may appear below or above the sheeting only, or in any combination of below, in the plane of, and above the sheeting, as desired.

The sheetings 10, 20 of FIGS. 1A and 1B may be used in a variety of applications. As one example, a sheeting having a shape-memory polymer material and imaged as described may be used as a passive sensor for visually indicating exposure to a given temperature. As another example, the sheeting may operate as a moisture sensor, pressure sensor or may sense the presence of a solvent. The sheeting may also be used as a security feature that visually alters in response to the external stimulus, thereby confirming authenticity of an article to which the sheeting is affixed. As a security feature, the sheeting may be used in a variety of applications such as banknotes, passports, drivers' licenses, identification cards, credit cards, or other security documents.

Figure 2:
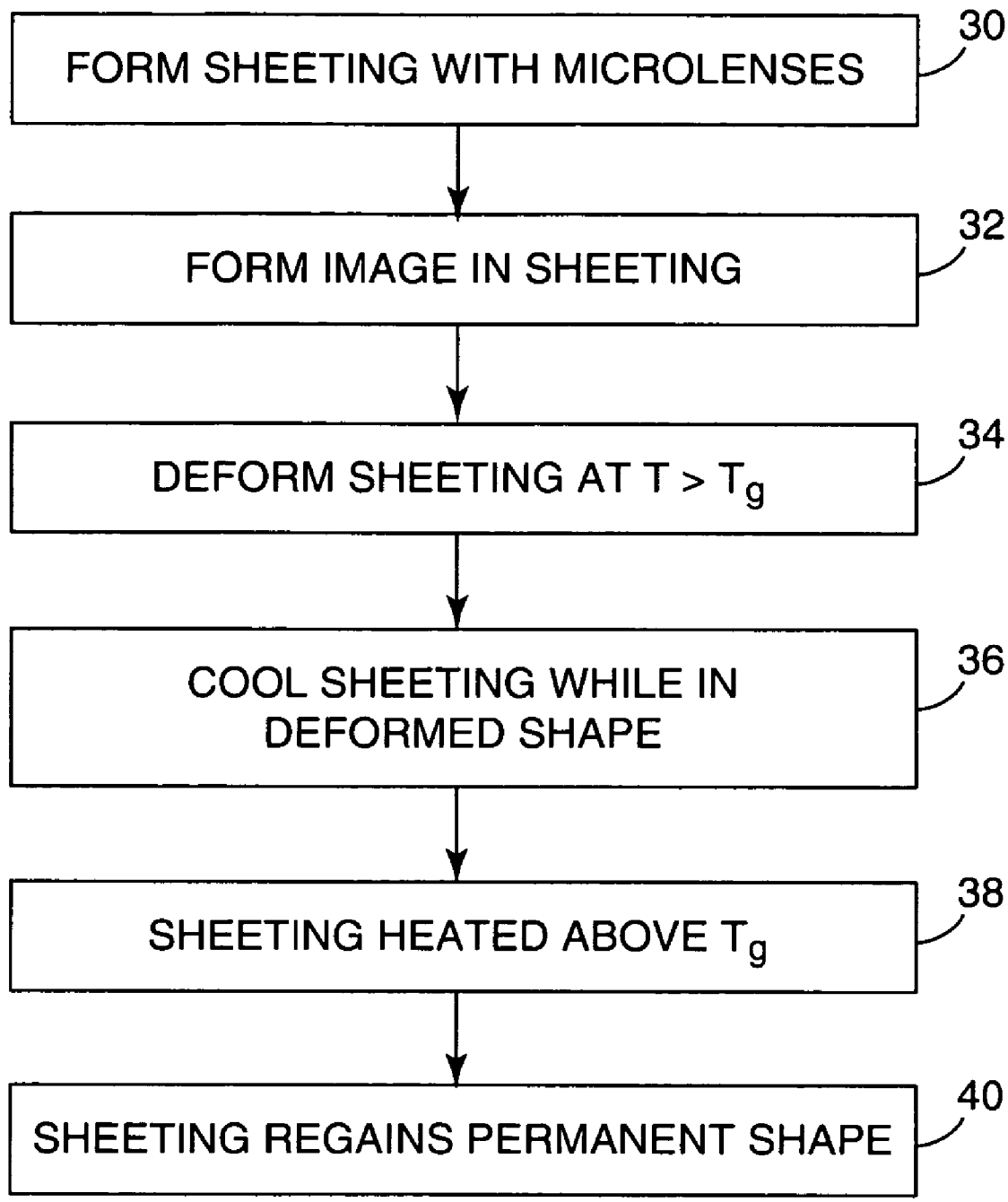
FIG. 2 is a flowchart illustrating an example process of producing a sheeting having a layer of microlenses formed of a shape-memory material.

FIG. 2 is a flowchart illustrating an example method of producing a sheeting having a layer of microlenses formed from a shape-memory material that predictably alters the optical properties of the microlenses when exposed to one or more external stimuli. Initially, a sheeting containing an array of microlenses is formed from a shape-memory polymer material (30). For example, a sheeting having a microlens array may be produced by casting a solution on a tool having an array of depressions, and curing the solution by exposure to ultraviolet (UV) light. The resulting sheeting may be similar to sheeting 10 or sheeting 20 of FIGS. 1A, 1B, respectively. This configuration, or second state, is referred to herein as the "permanent" shape of the sheeting. Next, an image is formed in the sheeting (32). The image may be a composite image, referred to as a "virtual" or "floating" image, formed using one of the techniques described above.

During manufacturing, the sheeting may then be heated to a temperature above the $T_g$ of the shape-memory polymer, and then physically deformed in some manner (34). As one example, the sheeting may be flattened by applying a compression force to the sheeting. The deformation results in a change in an optical property of the microlenses, such as the focal length of the microlenses. For example, when the sheeting is flattened, the radius of curvature of the microlenses increases, as well as the focal length. Because of the change in the optical property, the virtual image may no longer be visible or may be visually altered. The sheeting is then cooled while being held in the deformed shape (36). This process results in the sheeting being fixed in the temporary deformed shape, referred to as the first state. This process of fixing the sheeting into a temporary shape is referred to as "programming."

The sheeting will maintain the flattened shape until the sheeting is again heated to a temperature above the $T_g$ of the shape-memory polymer (38), at which point the sheeting recovers its permanent shape (the second state) (40), and the virtual image reappears or returns to its original visual appearance. For example, while in the first state the microlenses may have a radius of curvature between 50-70 microns, while in the second state, the microlenses may have a radius of curvature between 20-35 microns. As another example, while in the first state, the microlenses may have a focal length between 450-600 microns, while in the second state, the microlenses may have a focal length between 65-85 microns.

Figure 3:
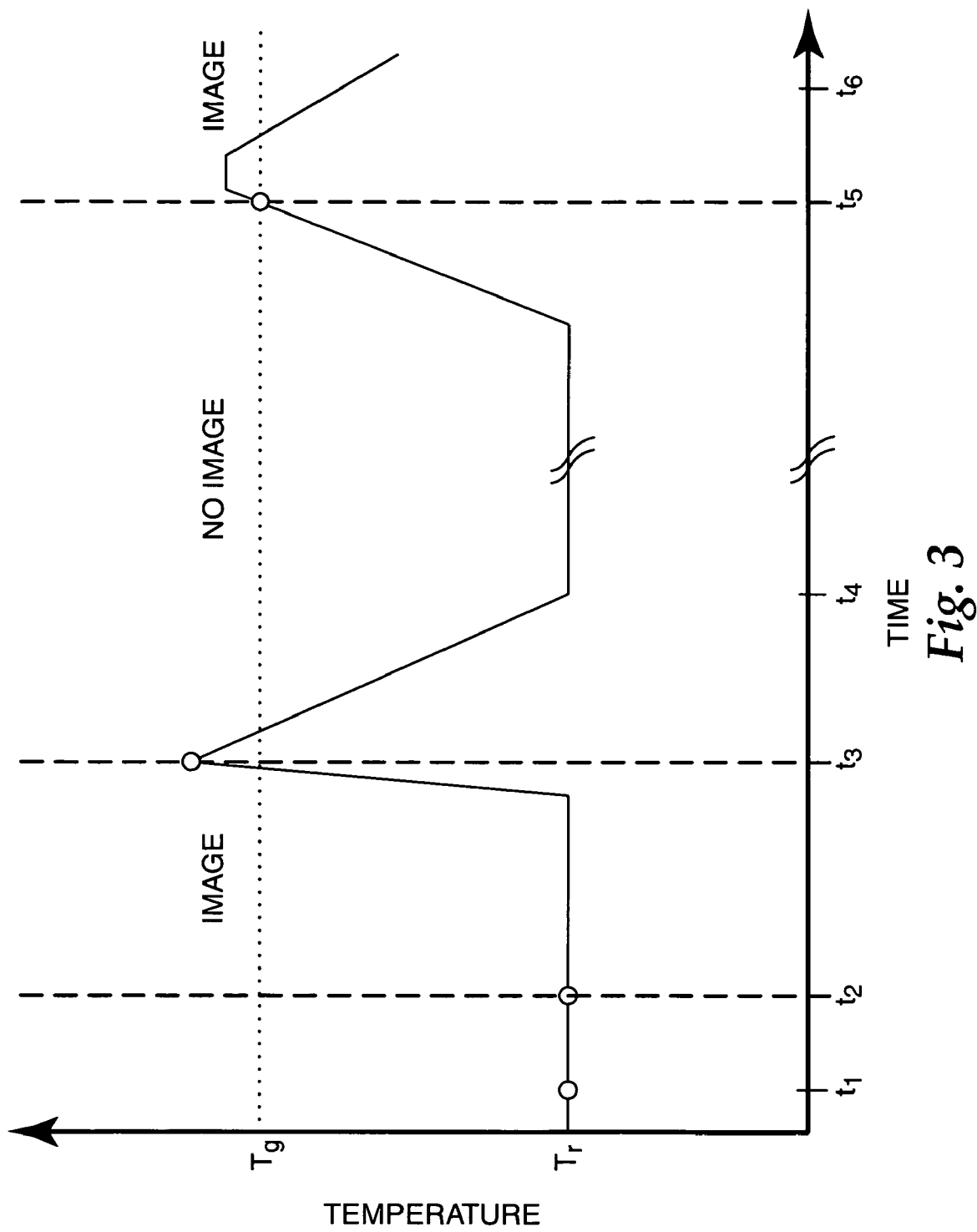
FIG. 3 is a graph illustrating temperature vs. time characteristics of an exemplary sheeting having a layer of microlenses formed from a shape-memory material.

FIG. 3 is a graph illustrating temperature vs. time characteristics of an exemplary sheeting having a layer of microlenses formed from a shape-memory material consistent with the principles of the invention. As shown in FIG. 3, at time $t_1$ the sheeting is cast with a shape-memory polymer to a permanent shape at room temperature $T_r$. The permanent shape includes an array of microlenses. At time $t_2$, the sheeting is imaged to include a virtual image as described above. At time $t_3$, the sheeting is heated to a temperature above the $T_g$ of the shape-memory polymer and deformed to a temporary shape by being flattened. As a result, the virtual image is no longer present. Between $t_3$ and $t_4$, the sheeting is cooled back down to room temperature $T_r$. The sheeting now holds its temporary shape. At time $t_5$ the sheeting is heated above $T_g$. The sheeting then regains its permanent shape, and the virtual image reappears. Thus, in this example, the virtual image is present from $t_2$ and $t_3$, is not visible from $t_3$ and $t_5$, and reappears after time $t_5$.

A temporary shaping other than the simple flattening of the microlenses described above may alternatively be used. For example, an embossing roll with a different design than the microlenses, or text on a size scale larger than the microlenses, might be employed. In the case where the microlenses are flattened everywhere and the pattern is even deeper, the object might appear to be a lettered message, or a large icon with no floating image. Upon heating, the large image may largely (or possibly completely disappear) while the floating image appears. If the regions between the embossments do not disturb the microlenses, it may be possible to have both the embossed image and the floating image (with various degrees of clarity depending on the proportion of microlenses that are disturbed) that becomes a more distinct floating image with the embossed image only a ghost image or possibly completely gone.

Figure 4:
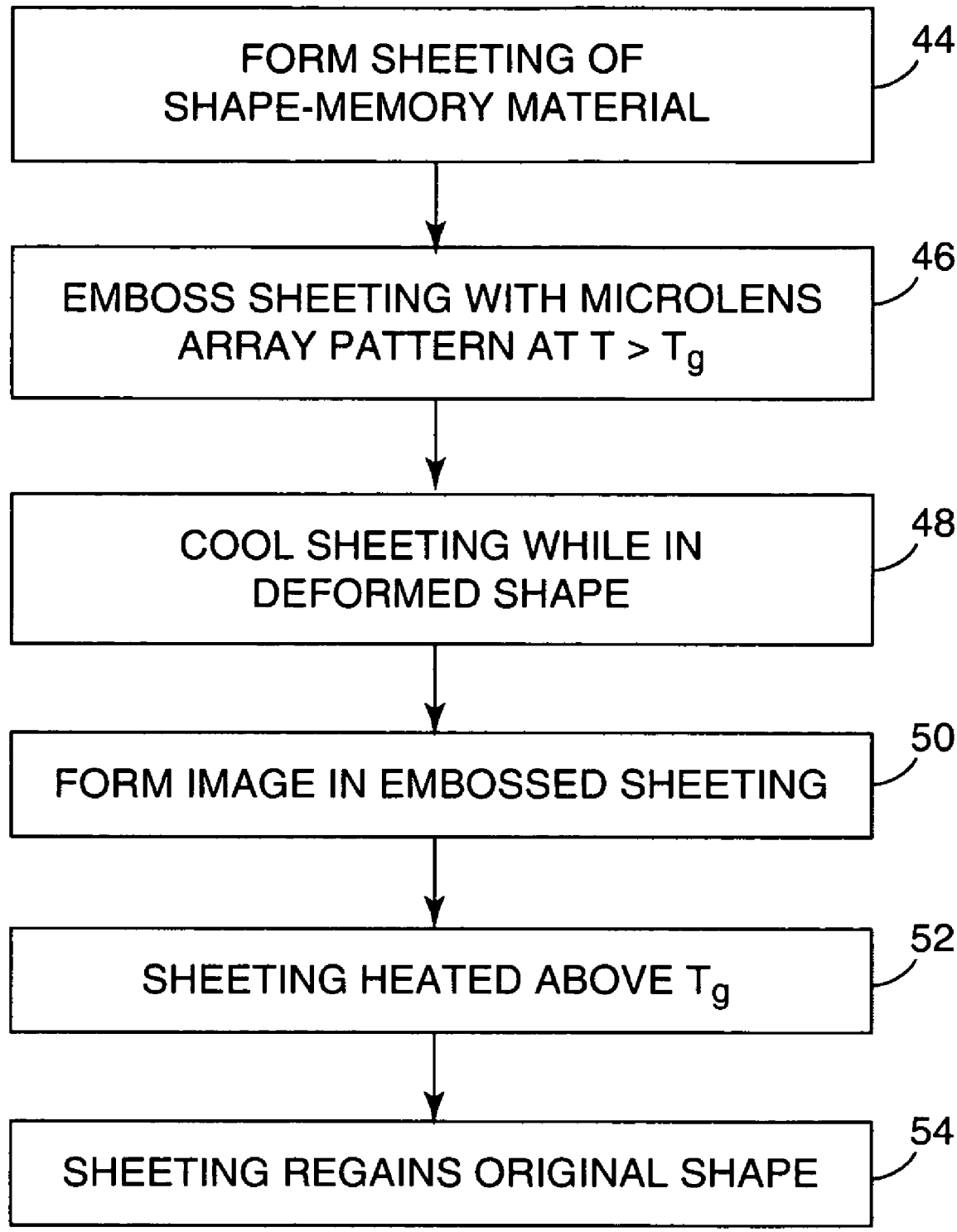
FIG. 4 is a flowchart illustrating an example process of programming a sheeting having a layer of microlenses formed of a shape-memory material.

FIG. 4 a flowchart illustrating another example method of producing a sheeting having a layer of microlenses formed from a shape-memory material. Initially, a sheeting is formed from a shape-memory polymer material (44). In this example, the sheeting may be formed in a substantially flat shape. The flat shape is the permanent shape of the sheeting. The sheeting is then heated to a temperature above the $T_g$ of the shape-memory polymer, and deformed by embossing with a microlens array pattern (46). The sheeting is cooled while being held in the embossed shape (48). As a result of the embossing, the sheeting holds a temporary shape having an array of microlenses.

The sheeting is then imaged as described above so that the sheeting produces a virtual image when viewed at the appropriate viewing angle (50). The sheeting will maintain the microlens array shape until the sheeting is again heated to a temperature above the $T_g$ of the shape-memory polymer (52), at which point the sheeting substantially recovers its permanent flat shape (54), and the virtual image disappears or visually alters. For example, when the sheeting returns to its flat shape, because of the change in an optical property of the microlenses, i.e., the radius of curvature and thus the focal length, the virtual image may no longer be visible.

For example, while in the first state the microlenses may have a radius of curvature between 20-35 microns; and while in the second state, the microlenses may have a radius of curvature greater than 250 microns. As another example, while in the first state, the microlenses may have a focal length between 75-95 microns, while in the second state, the microlenses may have a focal length between 750-950 microns.

Figure 5:
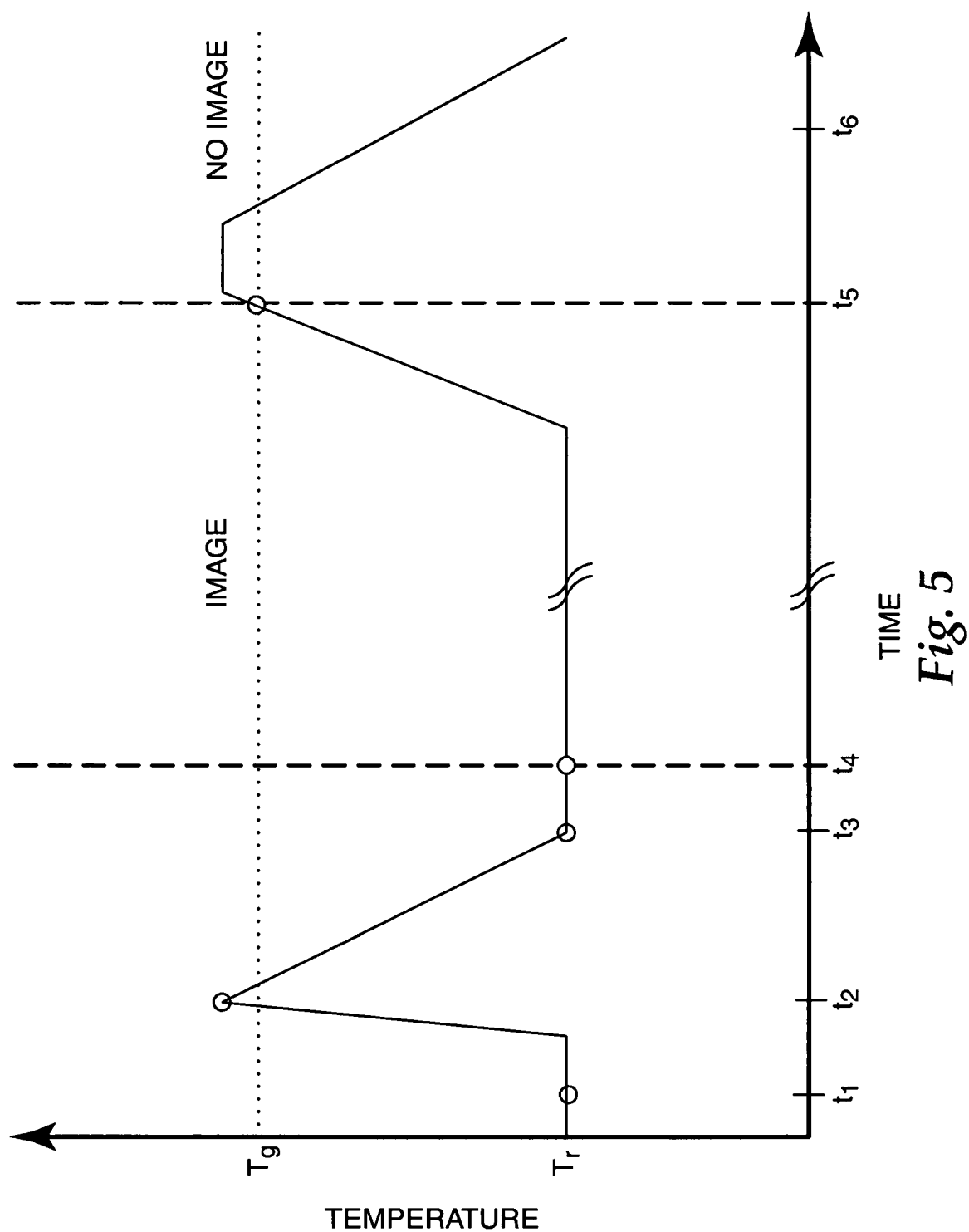
FIG. 5 is a graph illustrating temperature vs. time characteristics of another exemplary sheeting having a layer of microlenses formed of a shape-memory material.

FIG. 5 is a graph illustrating temperature vs. time characteristics of another exemplary sheeting having a layer of microlenses formed from a shape-memory material consistent with the principles of the invention. As illustrated in FIG. 5, at time $t_1$ the sheeting is cast with a shape-memory polymer to a permanent shape at room temperature $T_r$. At time $t_2$, the sheeting is heated to a temperature above the $T_g$ of the shape-memory polymer and deformed to a temporary shape by being embossed with a pattern to form an array of microlenses on a surface of the sheeting. Between $t_2$ and $t_3$, the sheeting is cooled back down to room temperature $T_r$. The sheeting now holds its temporary shape. At time $t_4$, the sheeting is imaged to include a virtual image as described above.

At a later time $t_5$ the sheeting is heated above $T_g$. The sheeting then substantially regains its permanent flat shape. As a result, the virtual image disappears. Thus, in this example, the virtual image is present from $t_4$ to $t_5$, and disappears after time $t_5$. In some embodiments, the sheeting may not return to exactly the original shape after being heated above $T_g$, and may retain a faint microlens array shape. However, the virtual image may still substantially disappear, because any residual microlens shapes will not have a sufficiently small radius of curvature to render the virtual image visible.

In the examples described in FIGS. 3 and 5, the sheetings may be used as sensors to detect and produce a visual indication that the sheeting was exposed to a temperature above $T_g$. For example, the sheeting may be applied to an article and used as a temperature sensor to indicate when the product has been exposed to a particular temperature. As one example, the article may be a pharmaceutical item or a food item that should not be exposed to high temperatures. The sheeting may be formed of a shape-memory material having a $T_g$ near a temperature at which the article may be damaged. In the example of FIG. 3, the sheeting may include a virtual image with a message or warning indicating that the article has been exposed to a high temperature and may have been damaged or may be unfit for consumption. In this example, the virtual image persists even when the sheeting later returns to a temperature below $T_g$, since the virtual image is present when the sheeting has returned to its permanent physical state. The virtual image may include text and/or graphics. In the example of FIG. 5, the sheeting may include a virtual image comprising text and/or graphics indicating that the article has not been exposed to undesirable conditions (e.g., high temperature). In this case, the virtual image disappears when the sheeting is exposed to a high temperature. The virtual image does not reappear even when the sheeting later returns to a temperature below $T_g$, since the sheeting has returned to its permanent physical state.

In some embodiments, the sheeting may act as a time/temperature indicator that indicates the article has been exposed to a range of temperatures for a corresponding range of cumulative amounts of time. For example, the shape-memory polymer may be such that exposure to a temperature slightly above $T_g$ for a longer period of time produces the same effect as exposure to a temperature significantly above $T_g$ for a shorter period of time. The shape-memory effect will occur after a cumulative exposure to a temperature above $T_g$.

In other example embodiments, the sheeting may indicate exposure to a solvent. For example, when the sheeting comes in contact with a solvent, the solvent may cause the microlenses to swell, which may alter the size or shape of the microlenses to cause the virtual image to change or disappear. Moreover, the solvent may lower the effective $T_g$ of the shape-memory material, in some cases to a temperature below room temperature. In this example, upon exposure to the solvent the sheeting may behave as though it has been brought above the $T_g$ of the shape-memory material, and experience the shape-memory effects described above. Upon evaporation of the solvent, the shape-memory material may substantially revert to its previous size and/or shape. The solvent preferably does not substantially damage or dissolve the shape-memory material.

In further example embodiments, the sheeting may indicate exposure to moisture. For example, the sheeting may be formed of a hydrophilic material, such as a hydrophilic acrylate. As another example, the sheeting may be formed of a hydrophilic hydrogel material, such as polyethylene oxide or polyvinyl alcohol. As yet another example, the sheeting may be formed of a water-based polymer cross-linked with urethane. For example, when the sheeting comes in contact with moisture, an optical property such as the refractive index n of the material may be altered. As another example, the radius of curvature of the microlenses may also change upon exposure to moisture.

As indicated above, a variety of shape-memory materials having a wide range of $T_g$ may be used to form the sheeting of the present invention. The appropriate shape-memory material and its corresponding $T_g$ may be selected depending on the particular application of the sheeting. For example, the sheeting may be formed of a shape-memory material having a high transition temperature, such as greater than 80° C., and more particularly between 80-90° C., or between 100-110° C. In another exemplary application of the principles of the disclosure, when the sheeting is formed of a shape-memory polymer having a $T_g$ slightly above room temperature, the virtual image may be made to disappear and/or reappear by application of pressure and body heat. In this case, the shape-memory polymer may have a transition temperature between 25-35° C. Such sheeting may be used as a security feature; for example, as a validation feature in banknotes, identification cards, drivers' licenses, credit cards, passports, and other security documents.

The principles of the invention will now be illustrated by way of three example sheetings produced as described herein.

EXAMPLE 1

Figure 6A:
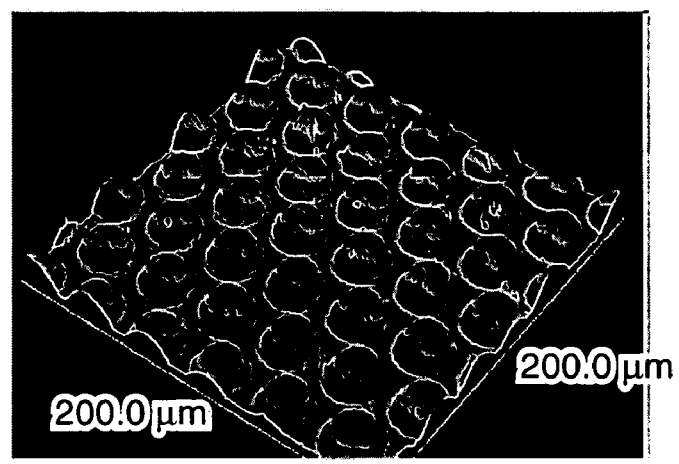
FIGS. 6A-6C are atomic force microscopy (AFM) images illustrating an example microlens array.
Figure 6B:
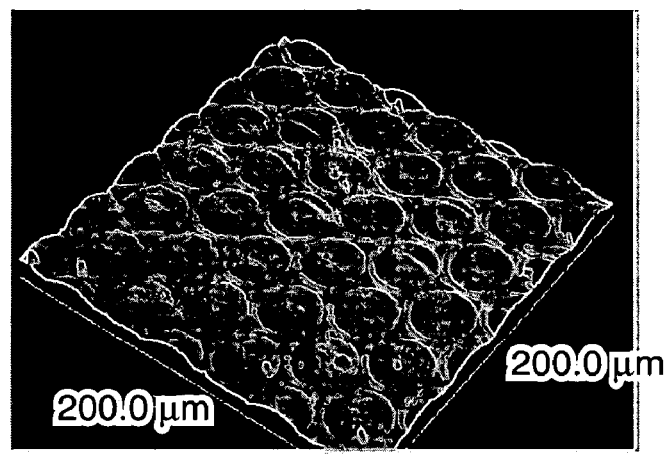
Figure 6C:
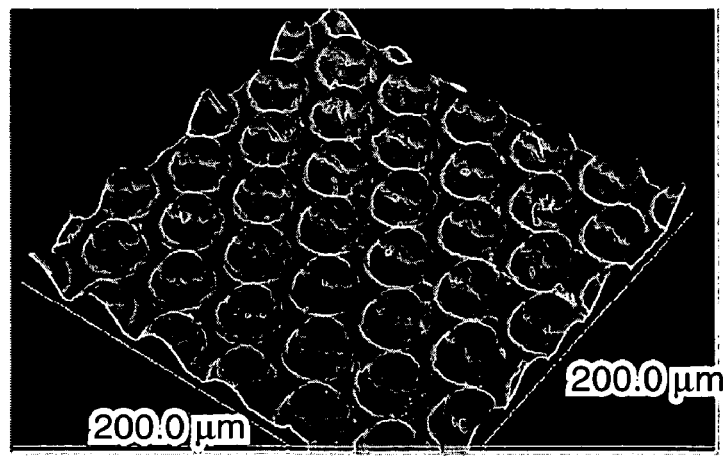

FIGS. 6A-6C are atomic force microscopy (AFM) images illustrating the results of a first experiment in which a microlens array was produced in accordance with the techniques described herein. A 5,000 MW telechelic silicone (methacryloxyurea-terminated polydimethylsiloxane) (5K MAUS) was dissolved in isobornyl acrylate (IBA) at 40/60 w/w to form a solution. Next, 0.5 wt % of the photoinitiator Darocur™ 1173 was added to the solution.

A film of this solution was cast on a 5 mil thick polyimide tool. The tool contained a hexagonal array of depressions (34-micron spacing) produced by the excimer laser machining of flats (ELMOF) process. See, for example, U.S. Pat. No. 6,285,001 to Fleming et al., dated Sep. 4, 2001, for details on the ELMoF process). The depressions had a diameter of 30 microns, with a spherical shape characterized by a radius of curvature of 28.7 microns and a conic constant of −0.745. The film on the polyimide substrate was covered with a sheet of polyethylene terephthalate (PET) and cured by exposure to low-intensity ultraviolet (UV) lights for 10 minutes. FIG. 6A is an atomic force microscopy (AFM) image illustrating the resulting microlens array produced by this process. The microlens array represented the permanent shape of the film (sheeting).

A piece of the microlens array film was flattened by compression against a PET film at 110° C., followed by cooling to room temperature under pressure. FIG. 6B is an AFM image illustrating the deformed microlens array film. The flattened microlens array film represented the temporary shape of the film. AFM analysis of the shape of the microlenses shown in FIGS. 6A and 6B suggests that the radius of curvature of the as-cast microlenses was approximately 23 microns, while the radius of curvature of the flattened microlenses was approximately 60 microns. This factor of 2.6 increase in the radius of curvature had a pronounced effect on the optical power of the flattened microlenses compared to the as-cast microlenses.

FIGS. 7A-7B are ray tracings illustrating the results of a ray tracing model (Zemax Optical Design Program, Zemax Development Corporation, Bellevue, Wash.) for (A) a lens of the as-cast microlenses and (B) a flattened lens of the flattened microlenses. FIGS. 8A-8B are optical micrographs for (A) the as-cast microlenses and (B) the flattened microlenses. The model suggests that the as-cast lens should focus visible light ($\lambda$=550 nm) to a near diffraction-limited spot at a distance of 74.4 microns from the front surface of the lens. In contrast, as shown in FIG. 7B, the focused spot size of the flattened lens at this distance was seven times larger than for the as-cast lens. This is consistent with the optical micrographs in FIGS. 8A-8B, which show that the focal plane formed by the lenses in the as-cast lens array were sharp, bright spots, while the image of that same plane for the flattened lens array contained much larger, dim spots.

Figure 9:
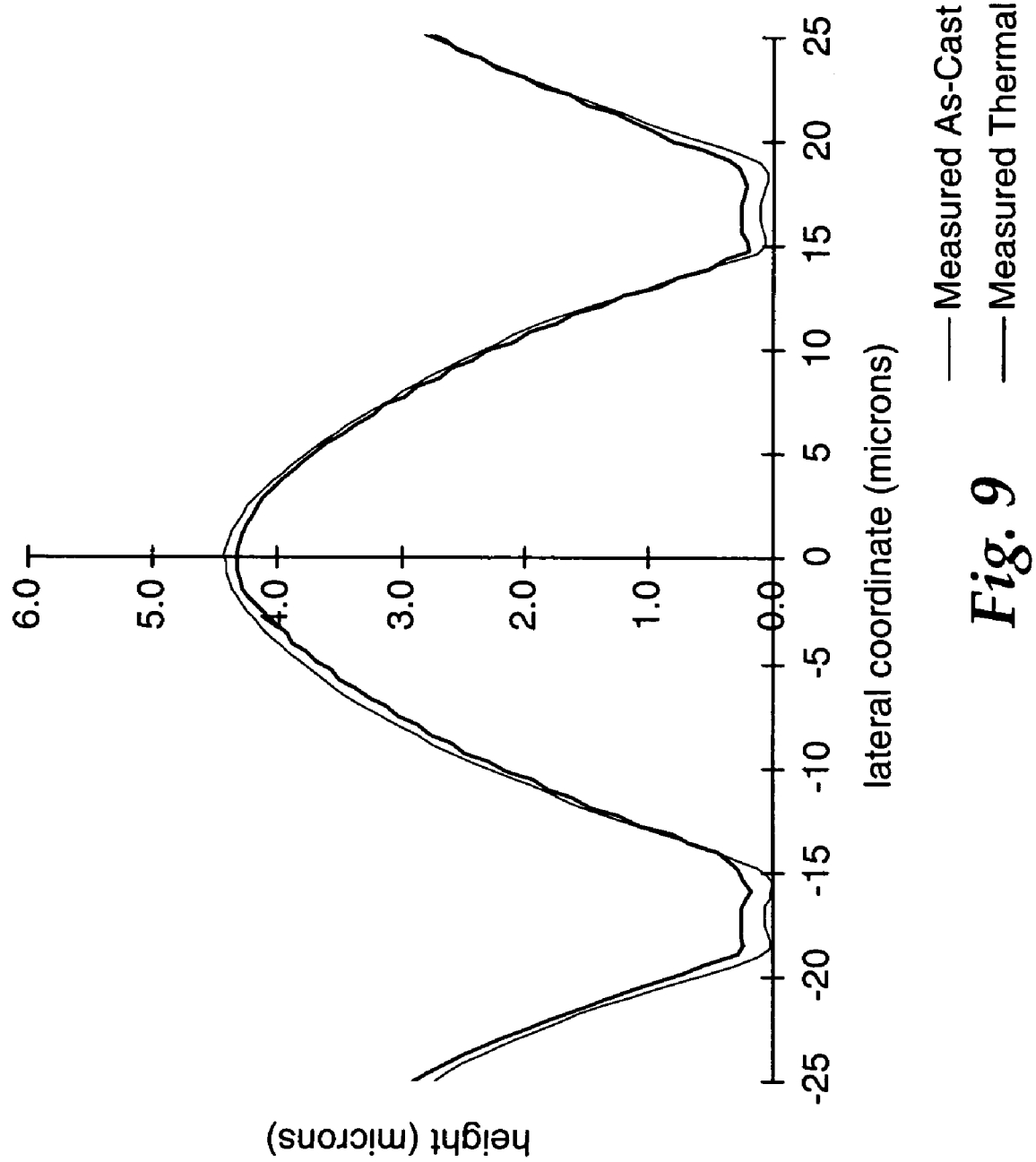
FIG. 9 is a graph illustrating a comparison of the surface profile, measured with AFM, of an as-cast microlens and a microlens that was deformed and then thermally restored.

The flattened film was subsequently heated in an unconstrained configuration to 110° C., resulting in the restored structure shown in FIG. 6C. FIG. 9 is a graph illustrating a comparison of the surface profile, measured with AFM, of an as-cast microlens and a microlens that was deformed and then thermally restored. Note that over the 30-micron diameter of these two lenses the difference in their surface profile was, at most, approximately 200 nm, indicating excellent restoration of the initial shape. These results indicated that the material could be incorporated into an optical device that can passively and reversibly change its optical performance depending on its thermal history. In this example, optical performance of the microlenses was destroyed by heat and pressure followed by recovery of the lens focusing power by heating.

EXAMPLE 2

In a second experiment, a flat 40/60 5K MAUS/IBA film was made by polymerizing the MAUS/IBA solution, as in Example 1, between two PET films separated with a spacer to control thickness. The resultant film was embossed with a microlens array pattern using the polyimide tool described in Example 1. The embossing procedure involved placing the tool on a liner laid down on a steel plate. The MAUS/IBA film was placed on the tool, covered with another PET film and another steel plate. The stack was then placed in a precision press, preheated to 110° C., pressed for 10 minutes, and then cooled to room temperature under pressure. A part of the replicated film was heated in an unconstrained configuration to a temperature of 110° for 10 minutes to restore the film to its original topology.

Figure 10A:
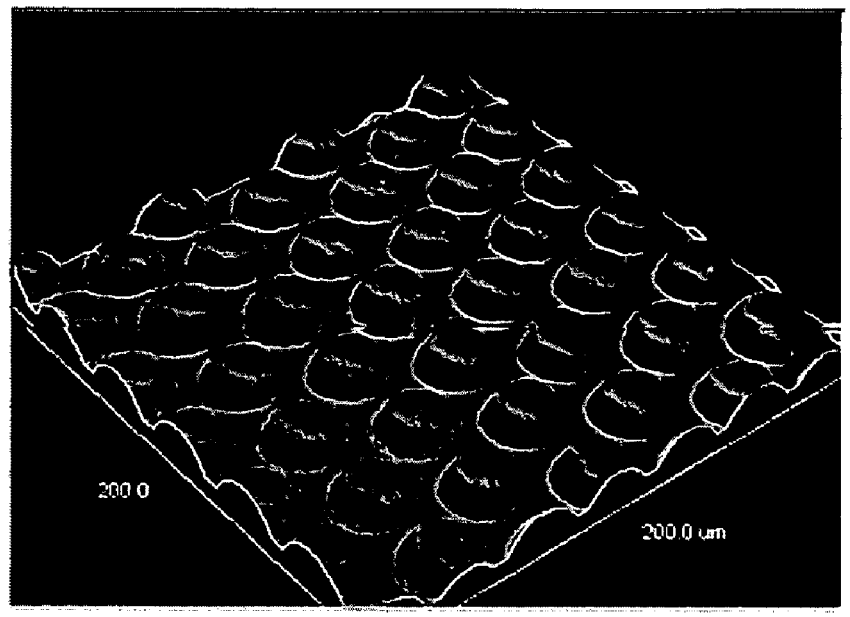
FIG. 10A is an AFM micrograph showing exemplary embossed microlenses.
Figure 10B:
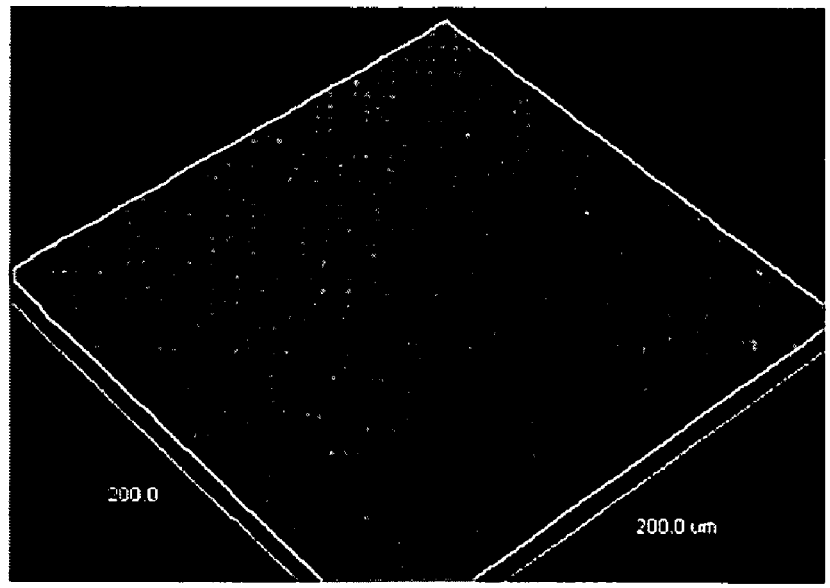
FIG. 10B is an AFM micrograph showing the embossed lenses after the film was restored to its original flat condition in accordance with the principles of the invention.

FIG. 10A shows an AFM micrograph of the embossed microlenses in this experiment and FIG. 10B shows an AFM micrograph of the embossed lenses after the film was 'restored' to its original flat condition. AFM profiles of the lens shapes suggest that the radius of curvature of the embossed lenses was approximately 29 microns while the radius of curvature of the 'restored' lenses is at least ten times that value. Using Equation 1 above, the embossed lenses had a focal length of approximately 87 microns, compared to a focal length of 870 microns for the lenses 'restored' to the flat condition. This example showed that by using MAUS/IBA films, functioning microlenses can be embossed on a shape-memory material using heat and pressure, and the microlenses experience a dramatic change in optical power on subsequent exposure to heat.

EXAMPLE 3

A sheeting was formed by coating shape-memory microlenses on a 7 mil thick polycarbonate film containing an additive that turns black on exposure to light from a Nd:YAG laser (wavelength=1064 nm). The film was coated with a solution containing 40% by weight of a silicone resin (5K methylstyrylurea siloxane (MeStUS)) and 60% by weight of isobornylacrylate (IBA). Darocur 1173 (0.5%) was used as the photoinitiator. A piece of fluorinated kapton tooling patterned by the ELMoF process containing the desired lens pattern was pressed against the coating and the coating was cured through the substrate using a 4-minute exposure to the output of a microwave-driven mercury lamp at an intensity of 31.4 milliwatts/cm$^2$ and a peak wavelength of 371 nm. The resulting sheeting contained 30 μm diameter, 60 μm focal length shape-memory lenses formed from the shape-memory polymer material. Floating images were drawn in the laser-engraveable polycarbonate film through the microlenses using a pulsed Nd:YAG laser operating at an average output power of 1 Watt (pulse duration of 1 nanosecond, pulse frequency of 1 kHz). The floating images were formed by black microimages produced behind each of the microlenses.

Figure 11A:
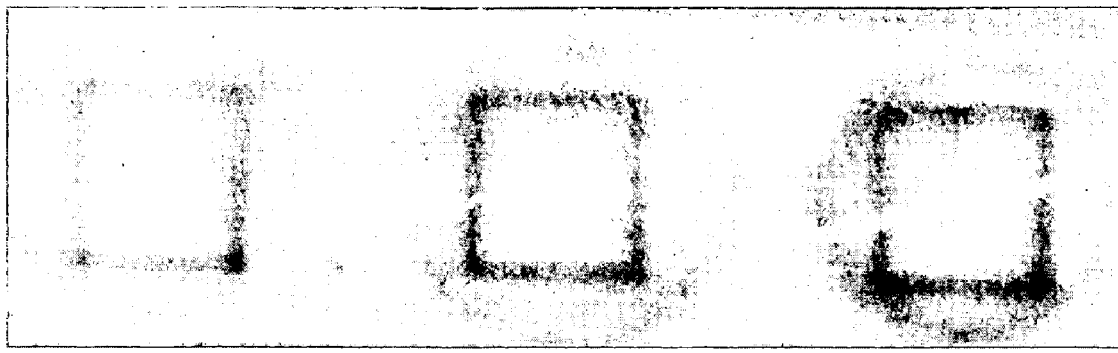
FIGS. 11A-11C are photographs of a sample sheeting imaged with a floating image that disappeared when the sheeting was compressed at a high temperature, and reappeared when the sheeting was heated.

FIG. 11A is a photograph of three exemplary images 52 drawn in a sample of the above-described sheeting. The images are floating/sinking squares and circles. The imaged sample sheeting shown in FIG. 11A was pressed at 280° F. (137.8° C.) for one minute and forty-five seconds between two polished chrome plates, approximately 3"×3" in size, with a force of 16,000 pounds. When the sample sheeting was removed from the press, the sheeting retained the flattened configuration, and contained areas that had a clear appearance due to flattening of the microlenses. In these clear areas the floating images of the floating/sinking circles and squares were no longer visible.

Figure 11B:
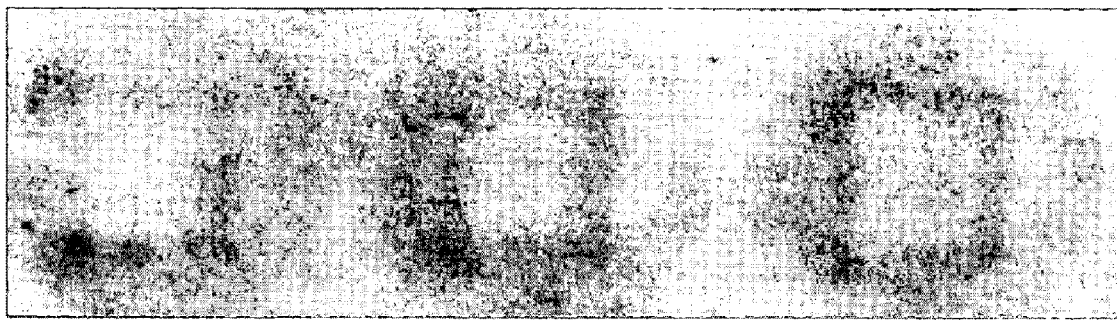
Figure 11C:
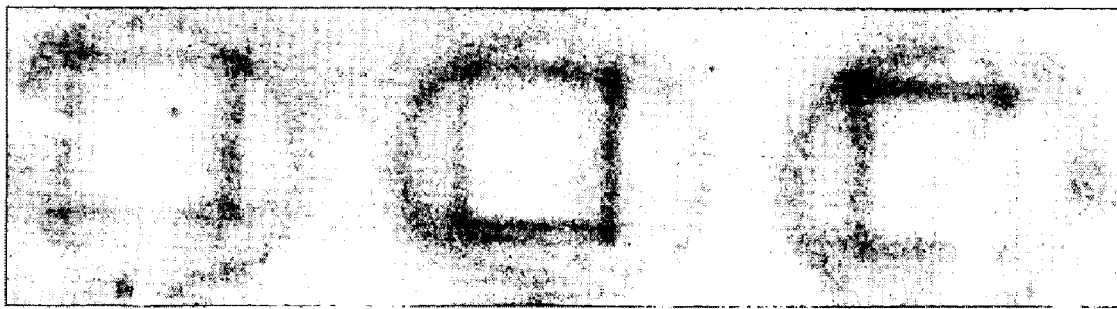

FIG. 11B is a photograph of one of the clear areas of the compressed sample sheeting. Although the floating images had disappeared, the sample sheeting retained a faint 2D image 54 showing the square and circle shape. This is due to the black microimages produced behind the microlenses during the floating image writing process. These 2D images were located in the shapes of the floating images so they gave a faint appearance of a 2D pattern, but did not appear as a floating/sinking floating image. When the sample sheeting was reheated to a temperature above the T$_g$ of the IBA component in the lens formulation, the original microlens shapes were regained and the floating images 52 reappeared. FIG. 11C is a photograph of the sample sheeting after being reheated.

Various embodiments of the invention have been described. These and other embodiments are within the scope of the following claims.

The inveniton claimed is:
1. A sheeting comprising:
a layer of a shape-memory polymer material having a surface of microlenses, wherein the shape-memory polymer comprises a polysiloxane with a poly(meth) acrylate switching segment, wherein the polysiloxane comprises a telechelic siloxane, wherein each of the microlenses is associated with one of a plurality of images within the sheeting, and
wherein the layer of the shape-memory polymer material is responsive to an external stimulus by transitioning from a first state in which an optical property of the microlenses has a first value to a second state in which the optical property of the microlenses has a second value.
2. The sheeting of claim 1, wherein the microlenses have refractive surfaces that transmit light to positions within the sheeting to produce a composite image from the images formed within the sheeting when the layer of the shape-memory polymer material is in one of the first state or the second state.
3. The sheeting of claim 2, wherein the composite image includes at least one of text or graphics.
4. The sheeting of claim 2, wherein the composite image includes a warning indicating that an article to which the sheeting has been applied may have been damaged.
5. The sheeting of claim 1, wherein at least one of the images is a partially complete image, and each of the images is associated with a different one of the microlenses.
6. The sheeting of claim 1, wherein each of the images associated with the microlenses is identical.
7. The sheeting of claim 1, wherein the external stimulus is a temperature greater than a transition temperature of the shape-memory polymer material.
8. The sheeting of claim 7, wherein the transition temperature is a glass transition temperature.
9. The sheeting of claim 1, wherein the external stimulus is a solvent or moisture.
10. The sheeting of claim 1, wherein the telechelic siloxane comprises one of methacryloxyurea siloxane (MAUS), acrylamidoamido siloxane (ACMAS), methacrylamidoamido siloxane (MACMAS), and methylstyrylurea siloxane (MeStUS).
11. The sheeting of claim 1, wherein the poly(meth)acrylate comprises a (meth)acrylate monomer comprising one of isobornyl acrylate, cyclohexyl acrylate, trimethyl cyclohexyl acrylate, methyl methacrylate, methacrylic acid, and t-butyl acrylate.
12. The sheeting of claim 1,
wherein the optical property is a focal length of the microlenses, and
wherein a radius of curvature of the microlenses changes when the layer of the shape-memory polymer material transitions from a first physical state to a second physical state.
13. The sheeting of claim 12,
wherein the microlenses have refractive surfaces that transmit light to positions within the sheeting to produce a composite image from the images formed within the layer of shape-memory polymer material when the layer exists in the second state, wherein the first value of the focal length is between 450-600 microns, and wherein the second value of the focal length is between 25-85 microns.

14. The sheeting of claim 12, wherein the microlenses have refractive surfaces that transmit light to positions within the sheeting to produce a composite image from the images formed within the layer of shape-memory polymer material when the layer exists in the first state, wherein the first value of the focal length is between 25-125 microns, and wherein the second value of the focal length is between 750 and 950 microns.

15. The sheeting of claim 1, wherein a transition temperature of the shape-memory polymer material is greater than 80° C.

16. The sheeting of claim 1, wherein a transition temperature of the shape-memory polymer material is between 25-35° C.

17. The sheeting of claim 1, further comprising a layer of material disposed adjacent to the layer of shape-memory polymer material opposite the surface of microlenses, wherein the microlenses form the one or more images within the material, and wherein the microlenses have refractive surfaces that transmit light to positions of the material to produce a composite image from the images formed within the material.

18. The sheeting of claim 17, wherein the layer of material is a radiation-sensitive material.

19. The sheeting of claim 1, wherein the microlenses form the one or more images within the layer of the shape-memory polymer material, and wherein the microlenses have refractive surfaces that transmit light to positions of the layer to produce a composite image from the images formed within the layer.

20. A sheeting comprising:

a layer of a shape-memory polymer material having a surface of microlenses, wherein the shape-memory polymer material comprises one of a polyurethane with a poly($\epsilon$-caprolactone) switching segment, a polyurethane with a poly(tetrahydrofuran) switching segment, polynorbornene, polyethylene or ethylene copolymers covalently cross-linked, and an oligo($\epsilon$-caprolactone) diol functionalized with a methacrylate end group, wherein each of the microlenses is associated with one of a plurality of images within the sheeting and wherein the layer of the shape-memory polymer material is responsive to an external stimulus by transitioning from a first state in which an optical property of the microlenses has a first value to a second state in which the optical property of the microlenses has a second value.

21. An article having a sheeting affixed thereto, wherein the sheeting comprises: a layer of a shape-memory polymer material having a surface of microlenses that visually produce a composite image from one or more images formed at positions within the sheeting, wherein the shape-memory polymer comprises a polysiloxane with a poly(meth)acrylate switching segment, wherein the polysiloxane comprises a telechelic siloxane, and wherein the layer of the shape-memory polymer material is responsive to an external stimulus by transitioning from a first state in which an optical property of the microlenses has a first value to a second state in which the optical property of the microlenses has a second value.

22. The article of claim 21, wherein the sheeting visually indicates exposure of the article to one of moisture, a pressure, or a temperature.

23. The article of claim 21, wherein the article is one of a banknote, a passport, a drivers' license, an identification card, a credit card, or a security document.

24. An article having a sheeting affixed thereto, wherein the sheeting comprises:

a layer of a shape-memory polymer material having a surface of microlenses that visually produce a composite image from one or more images formed at positions within the sheeting, wherein the shape-memory polymer material comprises one of a polyurethane with a poly($\epsilon$-caprolactone) switching segment, a polyurethane with a poly(tetrahydrofuran) switching segment, polynorbornene, polyethylene or ethylene copolymers covalently cross-linked, and an oligo($\epsilon$-caprolactone) diol functionalized with a methacrylate end group, and wherein the layer of the shape-memory polymer material is responsive to an external stimulus by transitioning from a first state in which an optical property of the microlenses has a first value to a second state in which the optical property of the microlenses has a second value.

25. The article of claim 24, wherein the sheeting visually indicates exposure of the article to one of moisture, a pressure, or a temperature.

26. The article of claim 24, wherein the article is one of a banknote, a passport, a drivers' license, an identification card, a credit card, or a security document.

* * * * *

UNITED STATES PATENT AND TRADEMARK OFFICE
CERTIFICATE OF CORRECTION

PATENT NO.        : 7,586,685 B2
APPLICATION NO.   : 11/495999
DATED             : September 8, 2009
INVENTOR(S)       : Douglas Scott Dunn Page 1 of 1

It is certified that error appears in the above-identified patent and that said Letters Patent is hereby corrected as shown below:

Column 5
Line 46; Delete "poly(F-caprolactone)" and insert -- poly($\epsilon$-caprolactone) --, therefor.
Line 50; Delete "oligo(F-caprolactone)" and insert -- oligo($\epsilon$-caprolactone) --, therefor.

Column 12
Line 2; Delete "(ELMOF)" and insert -- (ELMoF) --, therefor.

Column 15
Line 48; In Claim 20, delete "sheeting" and insert -- sheeting, --, therefor.

Signed and Sealed this
Eleventh Day of October, 2011

David J. Kappos
*Director of the United States Patent and Trademark Office*